US012487394B2

(12) United States Patent
Ha et al.

(10) Patent No.: US 12,487,394 B2
(45) Date of Patent: Dec. 2, 2025

(54) GLASS ASSEMBLY AND ELECTRONIC DEVICE INCLUDING SAME

(71) Applicant: Samsung Electronics Co., Ltd., Suwon-si (KR)

(72) Inventors: Dohyung Ha, Suwon-si (KR); Minhoo Park, Suwon-si (KR); Kisung Kim, Suwon-si (KR); Yeran Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 18/355,651

(22) Filed: Jul. 20, 2023

(65) Prior Publication Data

US 2023/0367183 A1 Nov. 16, 2023

Related U.S. Application Data

(63) Continuation of application No. PCT/KR2021/019692, filed on Dec. 23, 2021.

(30) Foreign Application Priority Data

Feb. 16, 2021 (KR) ........................ 10-2021-0020235

(51) Int. Cl.
*F21V 8/00* (2006.01)
*H04M 1/02* (2006.01)
(Continued)

(52) U.S. Cl.
CPC ........... *G02B 6/006* (2013.01); *G02B 6/0055* (2013.01); *H04M 1/0264* (2013.01);
(Continued)

(58) Field of Classification Search
CPC .... G02B 6/006; G02B 6/0055; G02B 6/0025; G02B 6/0068; H04M 1/0264; H04M 1/02;
(Continued)

(56) References Cited

U.S. PATENT DOCUMENTS 8,527,020 B2 9/2013 Tho et al.
8,752,995 B2 6/2014 Park
(Continued)

FOREIGN PATENT DOCUMENTS

CN 110824775 A 2/2020
KR 20110030176 A 3/2011
(Continued)

OTHER PUBLICATIONS

International Search Report for PCT/KR2021/019692 mailed Apr. 19, 2022, 4 pages.
(Continued)

*Primary Examiner* — David Tung
(74) *Attorney, Agent, or Firm* — Nixon & Vanderhye, P.C.

(57) ABSTRACT

An example electronic device includes at least one glass assembly provided to be adjacent to the outside of a camera module or an electronic device, wherein the glass assembly may include glass; a first reflective layer stacked on the glass and provided to transmit and reflect light emitted from a light source; a second reflective layer which is provided to be spaced apart from the first reflective layer, and which has a higher reflectivity than that of the first reflective layer; a reflective space formed between the first reflective layer and the second reflective layer; the light source disposed on one side of the reflective space to emit light; and a pattern layer which is stacked on the first reflective layer to face the
(Continued)

reflective space, and which includes a pattern that becomes darker as the distance from the light source increases.

14 Claims, 16 Drawing Sheets

(51) Int. Cl.
    *H05B 47/105*     (2020.01)
    *H05B 47/155*     (2020.01)
    *H05B 47/16*     (2020.01)

(52) U.S. Cl.
    CPC ......... *H05B 47/105* (2020.01); *H05B 47/155* (2020.01); *H05B 47/16* (2020.01)

(58) Field of Classification Search
    CPC .... G03B 15/05; H05B 47/105; H05B 47/155; H05B 47/16
    See application file for complete search history.

(56) References Cited

U.S. PATENT DOCUMENTS

| | | | |
|---|---|---|---|
| 9,057,810 | B2 | 6/2015 | Baek et al. |
| 9,323,396 | B2 * | 4/2016 | Han ................... G06F 3/0425 |
| 9,906,257 | B2 * | 2/2018 | Choi ................... H04B 1/3888 |
| 10,073,210 | B2 | 9/2018 | Jang et al. |
| 10,084,501 | B1 | 9/2018 | Coverstone |
| 10,429,569 | B2 | 10/2019 | Wang et al. |
| 10,805,440 | B1 | 10/2020 | Pham |
| 10,845,528 | B2 | 11/2020 | Lim et al. |
| 10,921,631 | B2 * | 2/2021 | Lin ................... G02F 1/133512 |
| 11,473,755 | B2 | 10/2022 | Jung et al. |
| 12,122,131 | B2 * | 10/2024 | Chen ................... C23C 28/00 |
| 2011/0065480 | A1 | 3/2011 | Kim et al. |
| 2017/0012235 | A1 * | 1/2017 | Kwon ................... G09F 9/30 |
| 2018/0147810 | A1 * | 5/2018 | Cheon ................... B32B 7/12 |
| 2018/0335667 | A1 | 11/2018 | Wang et al. |
| 2018/0373370 | A1 * | 12/2018 | Jung ................... H04M 1/22 |
| 2020/0045155 | A1 * | 2/2020 | Ha ................... G02B 5/003 |
| 2020/0046235 | A1 * | 2/2020 | Jung ................... G06F 1/16 |
| 2020/0211487 | A1 | 7/2020 | Lee et al. |
| 2020/0264661 | A1 | 8/2020 | Kim et al. |

FOREIGN PATENT DOCUMENTS

| | | |
|---|---|---|
| KR | 101071952 B1 | 10/2011 |
| KR | 20130022074 A | 3/2013 |
| KR | 20130056389 A | 5/2013 |
| KR | 20150123086 A | 11/2015 |
| KR | 20180050017 A | 5/2018 |
| KR | 101909602 B1 | 10/2018 |
| KR | 10-2018-0127246 | 11/2018 |
| KR | 20180127246 A | 11/2018 |
| KR | 101991459 B1 | 6/2019 |
| KR | 10-2020-0024477 | 3/2020 |
| KR | 20200024477 A | 3/2020 |
| KR | 102181945 B1 | 11/2020 |
| WO | 2016200561 A1 | 12/2016 |

OTHER PUBLICATIONS

Written Opinion of the ISA for PCT/KR2021/019692 mailed Apr. 19, 2022, 4 pages.
Office Action dated May 14, 2025 in Korean Application No. 10-2021-0020235 and English-language translation.

* cited by examiner

GLASS ASSEMBLY AND ELECTRONIC DEVICE INCLUDING SAME

CROSS-REFERENCE TO RELATED APPLICATIONS

This application is a continuation of PCT/KR2021/019692, designating the United States, filed Dec. 23, 2021, in the Korean Intellectual Property Receiving Office, which is based on and claims priority to Korean Patent Application No. 10-2021-0020235, filed on Feb. 16, 2021, in the Korean Intellectual Property Office. The contents of each of these applications are incorporated by reference herein in their entireties.

FIELD

Background

The disclosure relates to a glass assembly and an electronic device including the same, and more particularly, to a glass assembly having various lighting effects and lighting shapes, and an electronic device including the same.

Description of Related Art

Electronic devices may include at least one among home appliances, electronic notebooks, portable multimedia players, mobile communication terminals, tablet personal computers (PCs), video/audio devices, desktop/laptop computers, and car navigation systems.

The aesthetic demand of electronic devices is continuously increasing. In addition, there is a demand for a three-dimensional expression with a sense of depth using optical patterns in electronic devices.

SUMMARY

Various example embodiments of the present disclosure are directed to providing a glass assembly capable of realizing a three-dimensional optical pattern, and an electronic device including the same.

Various example embodiments of the present disclosure are also directed to providing a glass assembly with improved design, and an electronic device including the same.

In an example embodiment of the present disclosure, an electronic device with a camera module may include at least one glass assembly provided adjacent to an outer periphery of the camera module or the electronic device, wherein the glass assembly includes glass, a first reflective layer stacked on the glass and provided to transmit and reflect light emitted from a light source, a second reflective layer which is provided to be spaced apart from the first reflective layer and which has a higher reflectance than the first reflective layer, a reflective space formed between the first reflective layer and the second reflective layer, a light source disposed on one side of the reflective space and configured to emit light, and a pattern layer which is stacked on the first reflective layer to face the reflective space and which includes a pattern becoming darker as the distance from the light source increases.

In accordance with various example embodiments of the present disclosure, a glass assembly capable of realizing a three-dimensional optical pattern, and an electronic device including the same, can be provided.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
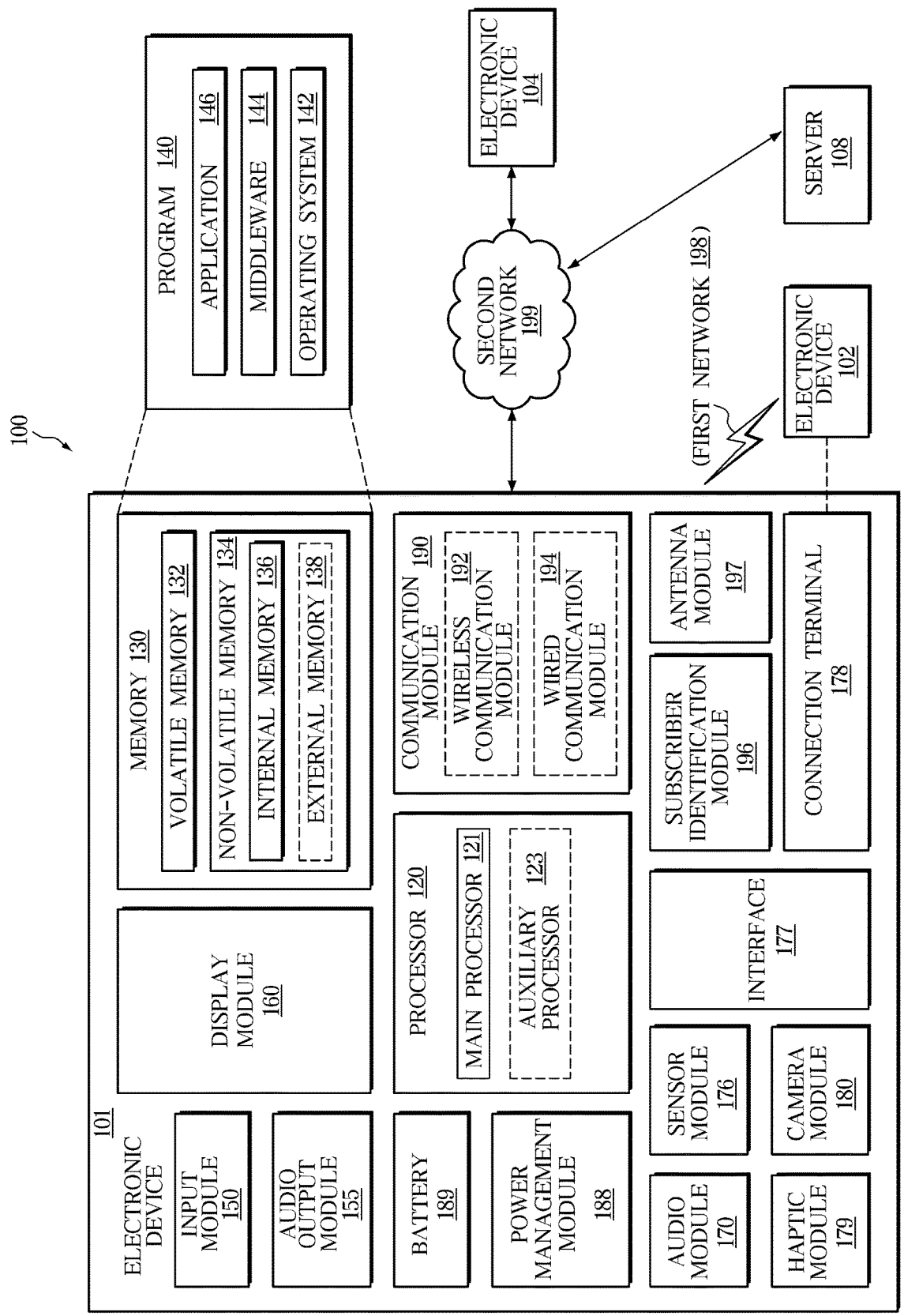
FIG. 1 is a block diagram of an example electronic device in a network environment according to various embodiments.

FIG. 1 is a block diagram illustrating an example electronic device 101 in a network environment 100 according to various embodiments. Referring to FIG. 1, in the network environment 100, the electronic device 101 may communicate with an electronic device 102 through a first network 198 (e.g., a short-range wireless communication network) or may communicate with at least one of an electronic device 104 and a server 108 through a second network 199 (e.g., a long-range wireless communication network). According to an embodiment, the electronic device 101 may communicate with the electronic device 104 through the server 108. According to an embodiment, the electronic device 101 may include a processor 120, a memory 130, an input module 150, an audio output module 155, a display module 160, an audio module 170, a sensor module 176, an interface 177, a connection terminal 178, a haptic module 179, a camera module 180, a power management module 188, a battery 189, a communication module 190, a subscriber identification module 196, or an antenna module 197. In various embodiments, in the electronic device 101, at least one (e.g., the connection terminal 178) among the above components may be omitted or one or more other components may be added. In various embodiments, some of the above components (e.g., the sensor module 176, the camera module 180, or the antenna module 197) may be integrated into one component (e.g., the display module 160).

The processor 120 may execute, for example, software (e.g., a program 140) to control at least one other component (e.g., a hardware or software component) of the electronic device 101 connected to the processor 120 and may perform processing or calculation of a variety of data. According to an embodiment, as at least a part of data processing or calculation, the processor 120 may store a command or data, which is received from other components (e.g., the sensor module 176 or the communication module 190), in a volatile memory 132, process the command or data stored in the volatile memory 132, and store result data in a non-volatile memory 134. According to an embodiment, the processor 120 may include a main processor 121 (e.g., a central processing unit or an application processor) or an auxiliary processor 123 (e.g., a graphic processing unit, a neural processing unit (NPU), an image signal processor, a sensor hub processor, or a communication processor) which may be operated independently from or together with the main processor 121. For example, when the electronic device 101 includes the main processor 121 and the auxiliary processor 123, the auxiliary processor 123 may be set to consume less power than the main processor 121 or to be specialized for a designated function. The auxiliary processor 123 may be implemented separately from the main processor 121 or as a part of the main processor 121.

For example, the auxiliary processor 123 may control at least some of functions or states, which relate to at least one component (e.g., the display module 160, the sensor module 176, or the communication module 190) among the components of the electronic device 101, in place of the main processor 121 in a state of being inactive (e.g., sleep) or together with the main processor 121 in a state of being active (e.g., executing an application). According to an embodiment, the auxiliary processor 123 (e.g., an image signal processor or a communication processor) may be implemented as a part of other functionally related component (e.g., the camera module 180 or the communication module 190). According to an embodiment, the auxiliary processor 123 (e.g., an NPU) may include a hardware structure specialized for processing an artificial intelligence model. The artificial intelligence model may be generated through machine learning. For example, the machine learning may be performed in the electronic device 101 where the artificial intelligence model is executed or may be performed through a separate server (e.g., the server 108). A learning algorithm may include, for example, supervised learning, unsupervised learning, semi-supervised learning, or reinforcement learning, but the present disclosure is not limited to the above examples. The artificial intelligence model may include a plurality of artificial neural network layers. An artificial neural network may include a deep neural network (DNN), a convolutional neural networks (CNN), a recurrent neural network (RNN), a restricted Boltzmann machine (RBM), a deep belief network (DBN), a bidirectional recurrent deep neural network (BRDNN), a deep Q-network, or a combination of two or more of the above networks, but the present disclosure is not limited to the above examples. The artificial intelligence model may additionally or alternatively include a software structure in addition to the hardware structure. The memory 130 may store a variety of data used by at least one component of the electronic device 101 (e.g., the processor 120 or the sensor module 176). The data may include, for example, software (e.g., the program 140) and input data or output data for a command relating to the software. The memory 130 may include the volatile memory 132 or the non-volatile memory 134.

The program 140 may be stored as software in the memory 130 and may include, for example, an operating system 142, middleware 144, or an application 146.

The input module 150 may receive a command or data to be used for a component (e.g., the processor 120) of the electronic device 101 from the outside of the electronic device 101 (e.g., a user). The input module 150 may include, for example, a microphone, a mouse, a keyboard, a key (e.g., a button), or a digital pen (e.g., a stylus pen).

The audio output module 155 may output an audio signal to the outside of the electronic device 101. The audio output module 155 may include, for example, a speaker or a receiver. The speaker may be used for a general purpose such as multimedia playback or recording playback. The receiver may be used to receive an incoming call. According to an embodiment, the receiver may be implemented separately from the speaker or as a part of the speaker.

The display module 160 may visually provide information to the outside of the electronic device 101 (e.g., a user). The display module 160 may include, for example, a display, a hologram device, or a projector, and a control circuit for controlling a corresponding device. According to an embodiment, the display module 160 may include a touch sensor which is set to detect a touch or a pressure sensor which set to measure strength of a force generated by a touch.

The audio module 170 may convert a sound into an electrical signal or vice versa. According to an embodiment, the audio module 170 may acquire a sound through the input module 150 or output a sound through the audio output module 155 or an external electronic device (e.g., the electronic device 102) (e.g., a speaker or a headphone) connected directly or wirelessly to the electronic device 101.

The sensor module 176 may detect an operating state of the electronic device 101 (e.g., power or a temperature) or an external environmental state (e.g., a user state) and generate an electrical signal or data value corresponding to the detected state. According to an embodiment, the sensor module 176 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, and a temperature sensor, a humidity sensor, or an illuminance sensor.

The interface 177 may support one or more specified protocols which are usable to directly or wirelessly connect the electronic device 101 to an external electronic device (e.g., the electronic device 102). According to an embodiment, the interface 177 may include, for example, a high definition multimedia interface (HDMI), a universal serial bus (USB) interface, a secure digital (SD) card interface, or an audio interface.

The connection terminal 178 may include a connector through which the electronic device 101 may be physically connected to an external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or movement) or an electrical stimulus, which is recognized by a user through a tactile sense or a kinesthetic sense. According to an embodiment, the haptic module 179 may include, for example, a motor, a piezoelectric element, or an electrical stimulation device.

The camera module 180 may capture a still image and a moving image. According to an embodiment, the camera module 180 may include one or more lenses, image sensors, image signal processors, or flashes.

The power management module 188 may manage power supplied to the electronic device 101. According to an embodiment, the power management module 188 may be implemented, for example, as at least a part of a power management integrated circuit (PMIC).

The battery 189 may supply power to at least one component of the electronic device 101. According to an embodiment, the battery 189 may include, for example, a non-rechargeable primary battery, a rechargeable secondary battery, or a fuel cell.

The communication module 190 may establish a direct (e.g., wired) communication channel or a wireless communication channel between the electronic device 101 and an external electronic device (e.g., the electronic device 102, the electronic device 104, or the server 108) and support communication through the established communication channel. The communication module 190 may include one or more communication processors which operate independently from the processor 120 (e.g., an application processor) and support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). Among these communication modules, a corresponding communication module may communicate with the external electronic device 104 through the first network 198 (e.g., a near-field communication network such as Bluetooth, wireless fidelity (WiFi) direct, or infrared data association (IrDA)) or the second network 199 (e.g., a long-range communication network such as a legacy cellular network, a 5th-generation (5G) network, a next-generation telecommunication network, the Internet, or a computer network (e.g., a LAN or a wide area network (WAN)). These various types of communication modules may be integrated into one component (e.g., a single chip) or implemented as a plurality of separate components (e.g., a plurality of chips). The wireless communication module 192 may identify or authenticate the electronic device 101 in a communication network such as the first network 198 or the second network 199 using subscriber information (e.g., an international mobile subscriber identifier (IMSI)) stored in the subscriber identification module 196.

The wireless communication module 192 may support a 5th-generation (5G) network after a 4th-generation (4G) network and a next-generation communication technology, for example, a new radio (NR) access technology. The NR access technology may support high-speed transmission of high-capacity data (enhanced mobile broadband (eMBB)), terminal power minimization and connection of multiple terminals (massive machine type communications (mMTC)), or ultra-reliable and low-latency communications (URLLC). The wireless communication module 192 may support, for example, a high frequency band (e.g., mmWave band) in order to achieve a high data rate. The wireless communication module 192 may support various technologies for securing performance in a high frequency band, for example, technologies including beam-forming, a massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate for implementing eMBB (e.g., 20 Gbps or more), a loss coverage for implementing mMTC (e.g., 164 dB or less), or a U-plane latency for implementing URLLC (e.g., a downlink (DL) and an uplink UL each of 0.5 ms or less, or a round trip of 1 ms or less).

The antenna module 197 may transmit or receive a signal or power to or from an external device (e.g., an external electronic device). According to an embodiment, the antenna module 197 may include an antenna including a radiator having a conductor or a conductive pattern formed on a substrate (e.g., a printed circuit board (PCB)). According to an embodiment, the antenna module 197 may include a plurality of antennas (e.g., an array antenna). In this case, at least one antenna suitable for a communication method used in a communication network such as the first network 198 or the second network 199 may be selected, for example, from the plurality of antennas by the communication module 190. A signal or power may be transmitted or received between the communication module 190 and an external electronic device through the selected at least one antenna. According to various embodiments, in addition to the radiator, other components (e.g., a radio frequency integrated circuit (RFIC)) may be additionally formed as a part of the antenna module 197.

According to various embodiments, the antenna module 197 may form a mmWave antenna module. According to an embodiment, the mmWave antenna module may include a PCB, an RFIC which is disposed on or adjacent to a first surface (e.g., a bottom surface) of the PCB and which is capable of supporting a designated high frequency band (e.g., a mmWave band), and a plurality of antennas (e.g., an array antenna) which are disposed on or adjacent to a second surface (e.g., a top surface or a side surface) of the PCB and which are capable of transmitting or receiving a signal in the designated high frequency band.

At least some of the components may be connected to each other through a communication method between peripheral devices (e.g., a bus, a general purpose input and output (GPIO), a serial peripheral interface (SPI), or a mobile industry processor interface (MIPI)) and may exchange signal (e.g., a command or data) with each other.

According to an embodiment, a command or data may be transmitted or received between the electronic device 101 and the external electronic device 104 through the server 108 connected to the second network 199. The external electronic devices 102 and 104 may each be the same type or a different type of a device as the electronic device 101. According to an embodiment, all or some of operations executed in the electronic device 101 may be executed in one or more external electronic devices among the external electronic devices 102, 104, and 108. For example, when the electronic device 101 needs to perform a predetermined function or service automatically or in response to a request from a user or other device, the electronic device 101 may request one or more external electronic devices to perform at least a part of the function or service instead of or in addition to executing the function or service by itself. The one or more external electronic devices receiving the request may execute at least a part of the requested function or service or execute an additional function or service relating to the request, and deliver the execution result to the electronic device 101. The electronic device 101 may directly provide the execution result or additionally process the execution result to provide the processed result as at least a part of a response to the request. To this end, for example, a cloud computing technology, a distributed computing technology, a mobile edge computing (MEC) technology, or a client-server computing technology may be used. The electronic device 101 may provide an ultra-low latency service using, for example, distributed computing or mobile edge computing. In an embodiment, the external electronic device 104 may include an Internet of things (IoT) device. The server 108 may be an intelligent server using machine learning and/or a neural network. According to an embodiment, the external electronic device 104 or the server 108 may be included in the second network 199. The electronic device 101 may be applied to an intelligent service (e.g., smart home, smart city, smart car, or health care) based on a 5G communication technology and an IoT-relating technology.

The electronic devices according to various embodiments disclosed in the present specification may include various types of devices. The electronic device may include, for example, a portable communication device (e.g., a smart phone), a computer device, a portable multimedia device, a portable medical device, a camera, a wearable device, a home appliance, or the like. The electronic devices according to the embodiments of the present disclosure are not limited to the above-described devices.

Various embodiments of the present specification and terms used therein are not intended to limit the technical features described herein to specific embodiments, but it should be understood to include various modifications, equivalents, or substitutes of the embodiments. In the description of the drawings, similar reference numerals may be used for similar or related components. The singular form of a noun corresponding to an item may include one item or a plurality of items, unless the relevant context clearly dictates otherwise. In the present specification, phrases such as "A or B," "at least one of A and B," "at least one of A or B," "A, B or C," "at least one of A, B and C," and "at least one of A, B, or C" may each include any one of the items listed together in the corresponding phrase among the above phrases or all possible combinations thereof. The terms "first," "second," "primary," and "secondary" may be merely used to distinguish a corresponding component from another corresponding component and may not limit corresponding components in another aspect (e.g., importance or an order). When one component (e.g., a first component) is referred to as being "coupled" or "connected" to another component (e.g., a second component) with or without the terms "functionally" or "communicatively," the one component can be connected to another component directly (e.g., by a wire), wirelessly, or through a third component.

The term "module" used in various embodiments of the present specification can include a unit implemented in hardware, software, or firmware, or any combination thereof, and can be interchangeably used with terms, for example, including a logic, a logic block, a component, and a circuit. The module may be an integrated component or the smallest unit or a part thereof performing one or more functions. For example, according to an embodiment, the module may be implemented in the form of an application-specific integrated circuit (ASIC).

Various embodiments of the present specification may be implemented as software (e.g., a program 140) including one or more commands stored in a storage medium (e.g., an internal memory 136 or an external memory 138) readable by a machine (e.g., the electronic device 101). For example, a processor (e.g., the processor 120) of the machine (e.g., the electronic device 101) may call at least one stored command among the one or more commands from the storage medium and execute the at least one called command. This allows the machine to be operated to perform at least one function according to the at least one called command. The one or more commands may include codes generated by a compiler or include codes executable by an interpreter. The machine-readable storage medium may be provided in the form of a non-transitory storage medium. Here, the "non-transitory storage medium" refers to a tangible device and does not contain signals (e.g., electromagnetic waves), and this term does not distinguish between a case in which data is semi-permanently stored in a storage medium and a case in which data is temporarily stored.

According to an example, the methods according to various embodiments disclosed herein may be included and provided in a computer program product. The computer program product may be traded between a seller and a buyer as a commodity. The computer program product is distributed in the form of a machine-readable recording medium (e.g., a compact disc read only memory (CD-ROM)), distributed through an application store (e.g., Play Store™), directly distributed between two user devices (e.g., smartphones), or distributed through online (e.g., downloaded or uploaded). In the case of the online distribution, at least a portion of a computer program product may be stored at least temporarily or generated temporarily in a machine-readable recording medium such as a manufacturer's server, an application store server, or a relay server's memory.

According to various embodiments, each component (e.g., a module or a program) of the above-described components may include a single entity or a plurality of entities, and some of the plurality of entities may be separately disposed in other components. According to various embodiments, one or more components or operations among the above-described corresponding components may be omitted, or one or more other components or operations may be added. Alternatively or additionally, a plurality of components (e.g., modules or programs) may be integrated into a single component. In this case, the integrated component may perform one or more functions of each of the plurality of components identically or similarly to those performed by a corresponding component among the plurality of components before the integration. According to various embodiments, operations performed by a module, a program, or other component are executed sequentially, parallel, iteratively, or heuristically, or one or more of the operations are executed in a different order or are omitted, or one or more other operation may be added.

According to various embodiments of the present disclosure, the electronic device may include at least one among a mobile communication terminal, a tablet PC, or a wearable electronic device. However, the description will be made below based on a mobile communication terminal.

Figure 2:
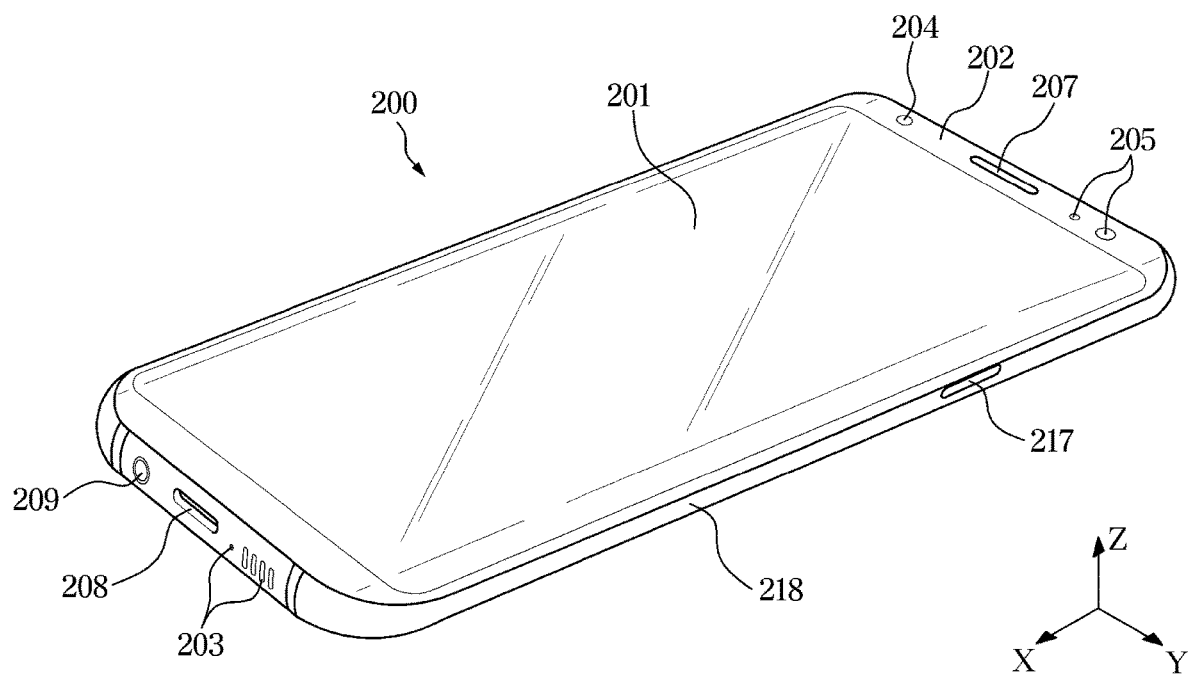
FIG. 2 is a perspective view of an example electronic device according to various embodiments.
Figure 3:
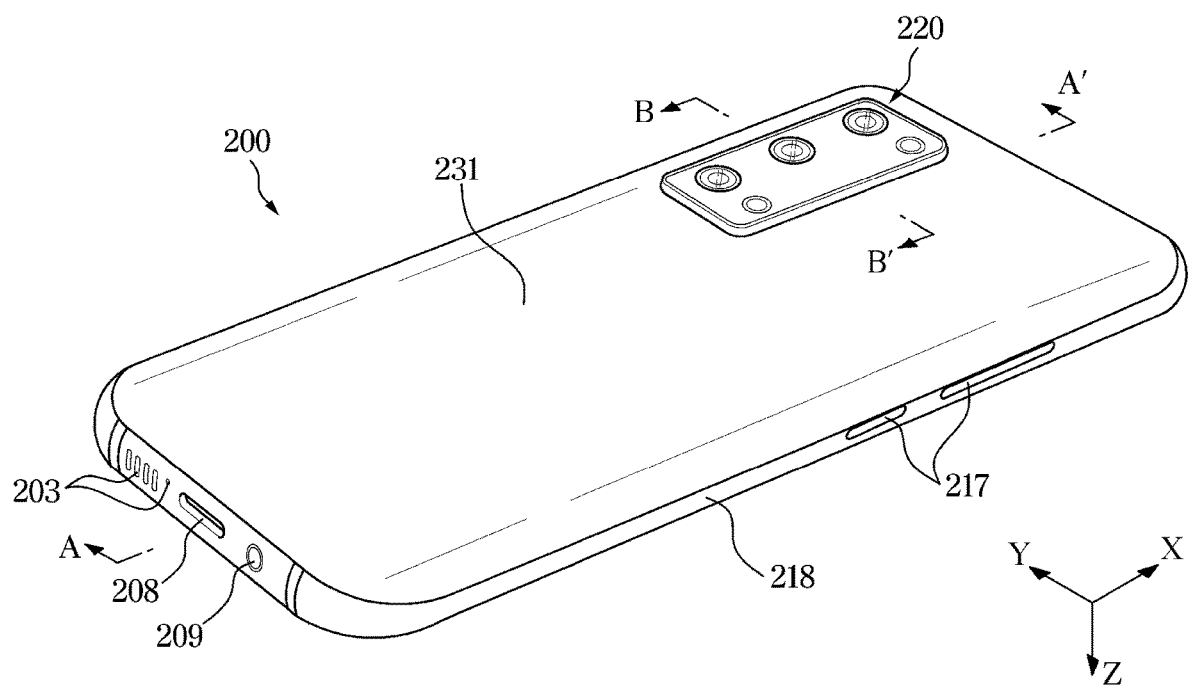
FIG. 3 is a rear perspective view of an example electronic device according to various embodiments.

FIG. 2 is a perspective view illustrating an example electronic device according to various embodiments. FIG. 3 is a rear perspective view illustrating the electronic device according to various embodiments.

Referring to FIGS. 2 and 3, an electronic device 200 (e.g., the electronic device 101 of FIG. 1) according to an embodiment of the present disclosure may include a housing 218, a display 201, a front plate 202, audio modules 203 and 207 (e.g., the audio module 170 of FIG. 1), a sensor module 204 (e.g., the sensor module 176 of FIG. 1), camera modules 205 and 220 (e.g., the camera module 180 of FIG. 1), and connector holes 208 and 209.

According to an embodiment of the present disclosure, the housing 218 may form a side surface of the electronic device 200. The housing 218 forms the side surface of the electronic device 200 to accommodate other structural bodies and electrical components therein.

According to an embodiment of the present disclosure, the display 201 (e.g., the display module 160 of FIG. 1) may be at least one among a liquid crystal display (LCD), a light-emitting diode (LED) display, an organic LED (OLED) display, and a micro electromechanical system (MEMS) display. According to an embodiment, the display 201 may be provided with a touch panel to perform a touch screen function. According to an embodiment, the display 201 may be electrically connected to a display circuit substrate (not shown).

According to an embodiment of the present disclosure, the front plate 202 may be formed at an outer periphery of the display 201. For example, the display 201 may be exposed through the front plate 202. In various embodiments, a corner of the display 201 may be formed to be substantially identical to an adjacent outer periphery shape of the front plate 202. In an embodiment (not shown), in order to expand the exposed area of the display 201, a gap between the outer periphery of the display 201 and an outer periphery of the front plate 202 may be formed to be substantially the same.

According to an embodiment of the present disclosure, the camera modules 205 and 220 may include a first camera device 205 disposed on the front plate 202 of the electronic device 200 and a second camera device 220 disposed on a glass 231. The camera devices 205 and 220 may each include one or a plurality of lenses, an image sensor, and/or an image signal processor. The second camera device 220 may be referred to as a camera module 220.

According to an embodiment of the present disclosure, key input devices 217 may be disposed in the housing 218. In an embodiment, the electronic device 200 may not include some or all of the key input devices 217 shown in the drawing, and the key input devices 217 which are not included may be implemented on the display 201 in other forms such as soft keys.

Figure 4:
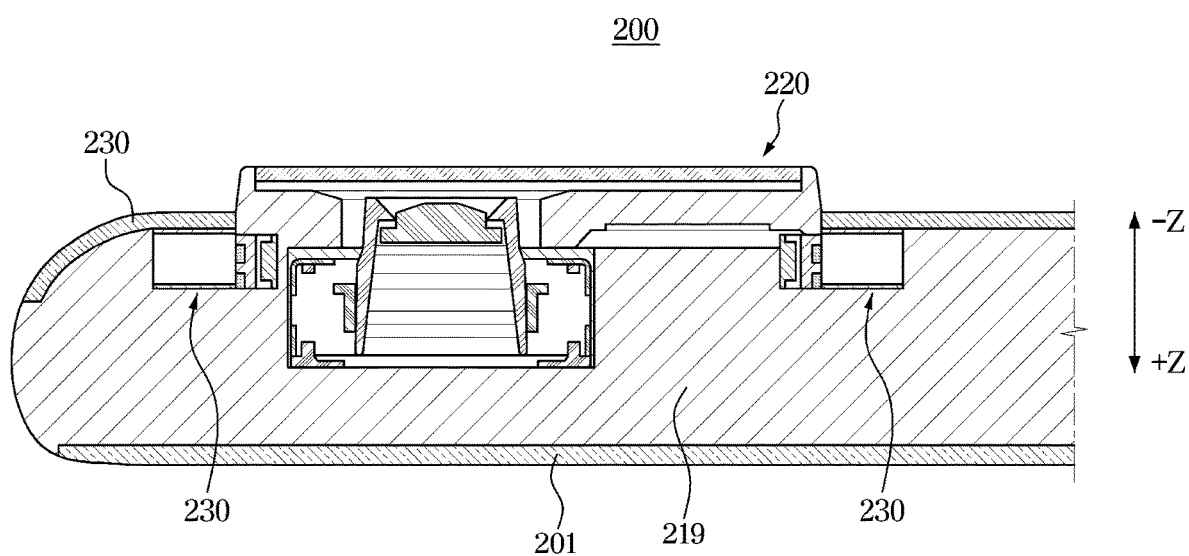
FIG. 4 is a cross-sectional view of an example electronic device according to various embodiments.
Figure 5:
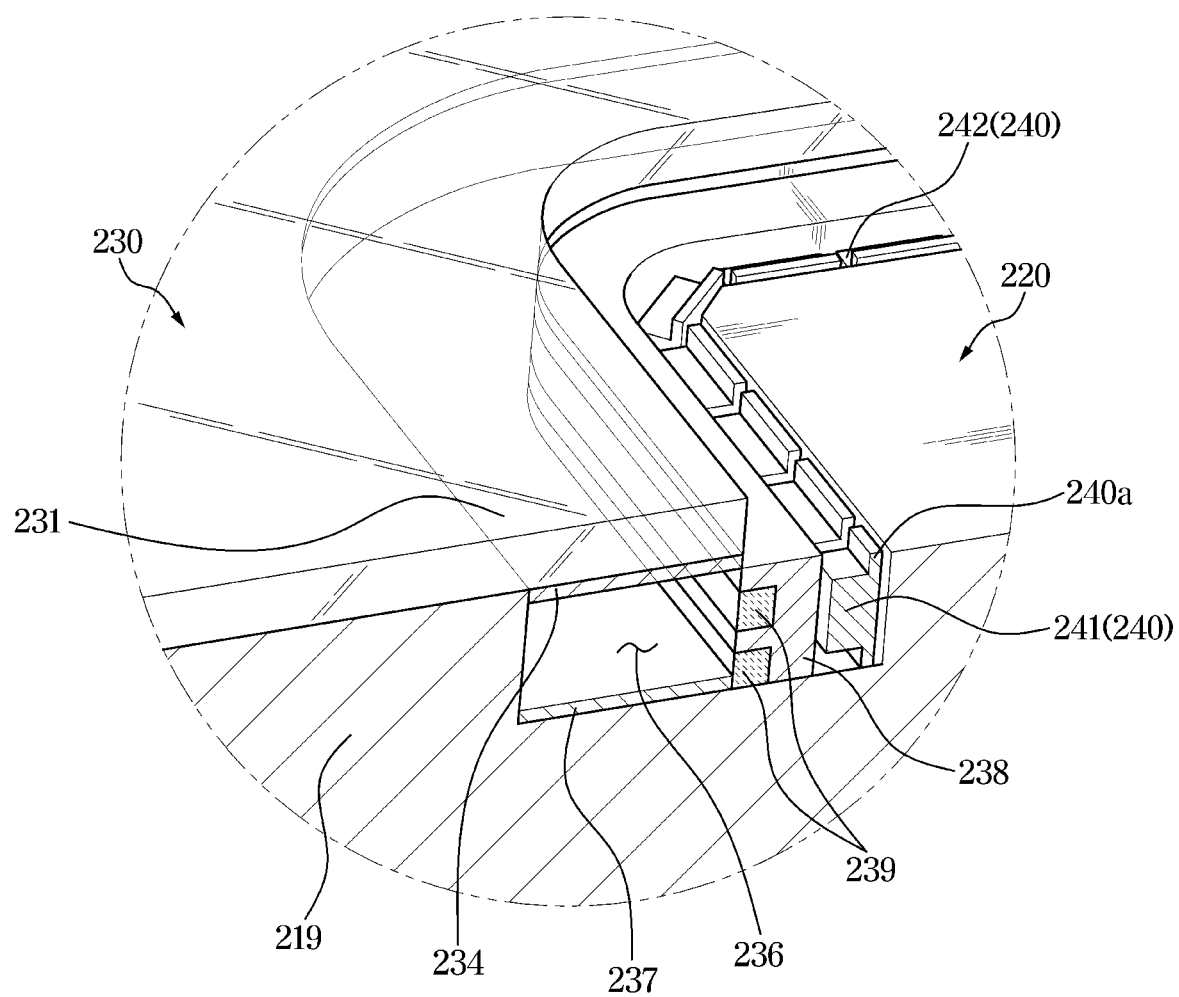
FIG. 5 is a perspective view of an example electronic device according to various embodiments.

FIG. 4 is a cross-sectional view illustrating an example electronic device according to various embodiments. FIG. 5 is a perspective view illustrating an example electronic device according to various embodiments.

FIG. 4 may be, for example, a cross-sectional view taken along line A-A' of the electronic device 200 shown in FIG. 3. FIG. 5 may be, for example, a cross-sectional perspective view taken along B-B' of the electronic device 200 shown in FIG. 3.

Referring to FIGS. 4 and 5, according to an embodiment of the present disclosure, the electronic device 200 may include a glass assembly 230 and an internal electrical component 219. The glass assembly 230 may be disposed to surround the camera module 220. However, the arrangement of the camera module 220 is not limited thereto, and the camera module 220 may be disposed at various positions.

According to an embodiment of the present disclosure, the glass assembly 230 may include the glass 231, an optical adhesive layer 232, a protective film layer 233, a first reflective layer 234, a pattern layer 235, a reflective space 236, a second reflective layer 237, a light guide plate 238, a blocking member 239, a light source 240, and a substrate.

According to an embodiment of the present disclosure, the glass assembly 230 may be manufactured through a film laminating technique or a direct printing method. However, the present disclosure is not limited thereto, and the glass assembly 230 may be manufactured through various stacking methods.

According to an embodiment of the present disclosure, the glass 231, the optical adhesive layer 232, the protective film layer 233, the first reflective layer 234, the pattern layer 235, the reflective space 236, and the second reflective layer 237 may be disposed in a first direction (e.g., a +Z to −Z direction). For example, the glass 231, the optical adhesive layer 232, the protective film layer 233, the first reflective layer 234, the pattern layer 235, the reflective space 236, and the second reflective layer 237 may be stacked in a front-rear direction (e.g., a Z direction). In addition, the reflective space 236, the blocking member 239, the light guide plate 238, the light source 240, and the substrate may be disposed in a second direction. For example, the reflective space 236, the blocking member 239, the light guide plate 238, the light source 240, and the substrate may be stacked in a left-right direction (e.g., a Y direction) or an X-direction.

According to an embodiment of the present disclosure, the glass 231 may be provided to form at least a portion of a rear surface of the electronic device 200. For example, the glass 231 may form the rear surface of the electronic device to protect internal electrical components of the electronic device. However, the glass 231 is not only disposed on the rear surface, and the glass 231 may also be disposed on a front surface of the display 201 to protect the display 201. In addition, the glass 231 of the glass assembly 230 may be disposed at an outer periphery line of the electronic device 200.

According to an embodiment of the present disclosure, the optical adhesive layer 232 and the protective film layer 233 having light transmittance may be stacked on the glass 231. The first reflective layer 234 may be provided on the protective film layer 233 to enable light reflection and/or light transmission. The pattern layer 235 having a pattern which becomes darker as the distance from the camera module 220 increases may be stacked on the first reflective layer 234. The pattern layer 235 may include a gradation pattern. For example, the pattern layer 235 may be transparent to allow light to be transmitted in a region adjacent to the camera module 220 and the light guide plate 238 and may become darker to prevent or reduce light from being transmitting as the distance from the camera module 220 and the light guide plate 238 increases. In this way, as described below, an effect in which lighting fades out may be implemented. The second reflective layer 237 may be disposed apart from the first reflective layer 234. The second reflective layer 237 may be provided to reflect all incident light. A reflectance of the second reflective layer 237 may be greater than that of the first reflective layer 234. For example, the first reflective layer 234 may have a reflectance of 50% and the second reflective layer 237 may have a reflectance of 100%. However, the present disclosure is not limited thereto, and the first reflective layer 234 and the second reflective layer 237 may each have a variety of reflectivities.

According to an embodiment of the present disclosure, the light source 240 for emitting light and a substrate 240a on which the light source 240 is mounted may be disposed on one side of the reflective space 236. The light guide plate 238 may be disposed between the light source 240 and the reflective space 236 to diffuse light emitted from the light source 240. The light source 240 and the light guide plate 238 may be separated by a predetermined distance.

According to an embodiment of the present disclosure, the blocking member 239 may be disposed between the light guide plate 238 and the reflective space 236 to generate a discontinuous lighting shape. The blocking member 239 may be inserted into and disposed in the light guide plate 238. Light may not be transmitted to or diffused in the blocking member 239. The blocking member 239 may be provided as a plurality of blocking members or a single blocking member.

According to an embodiment of the present disclosure, the light source 240 may be provided as a plurality of light sources. The plurality of light sources 240 may include a first light-emitting element group 241 and a second light-emitting element group 242. For example, the first light-emitting element group 241 may be disposed to emit light to one side of the electronic device 200, and the second light-emitting element group 242 may be disposed to emit light to the other side of the electronic device 200. The first light-emitting element group 241 may emit light to an upper side and/or a left side of the camera module 220, and the second light-emitting element group 242 may emit light to a lower side and/or a right side of the electronic device 200. However, the present disclosure is not limited thereto.

Figure 6:
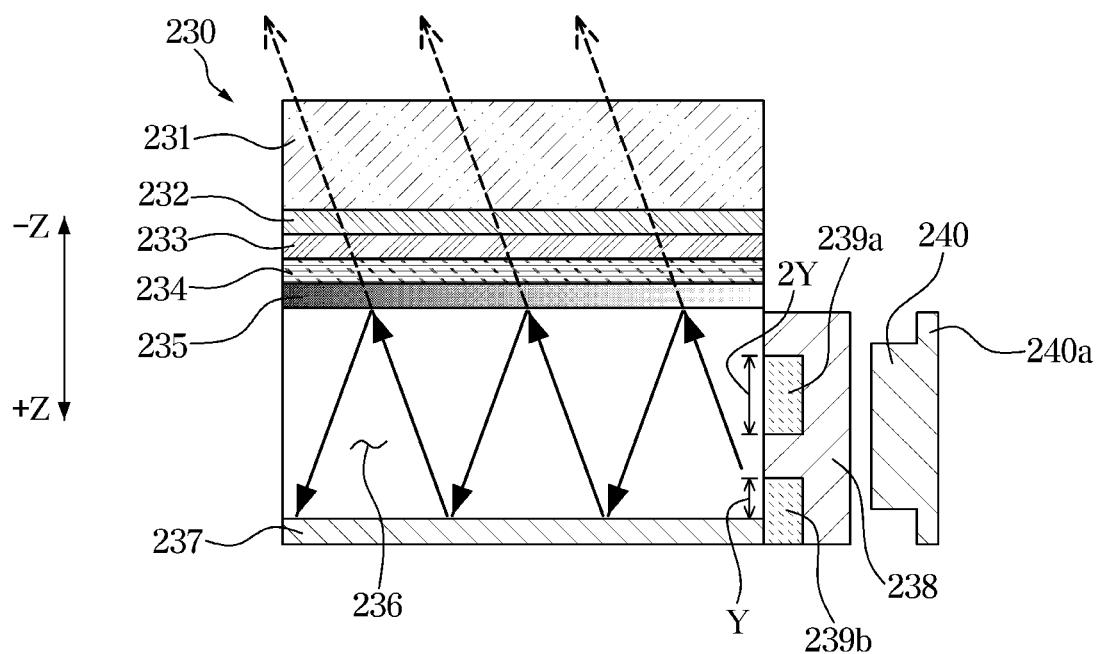
FIG. 6 is a schematic diagram of a main configuration of an example electronic device according to various embodiments.
Figure 7:
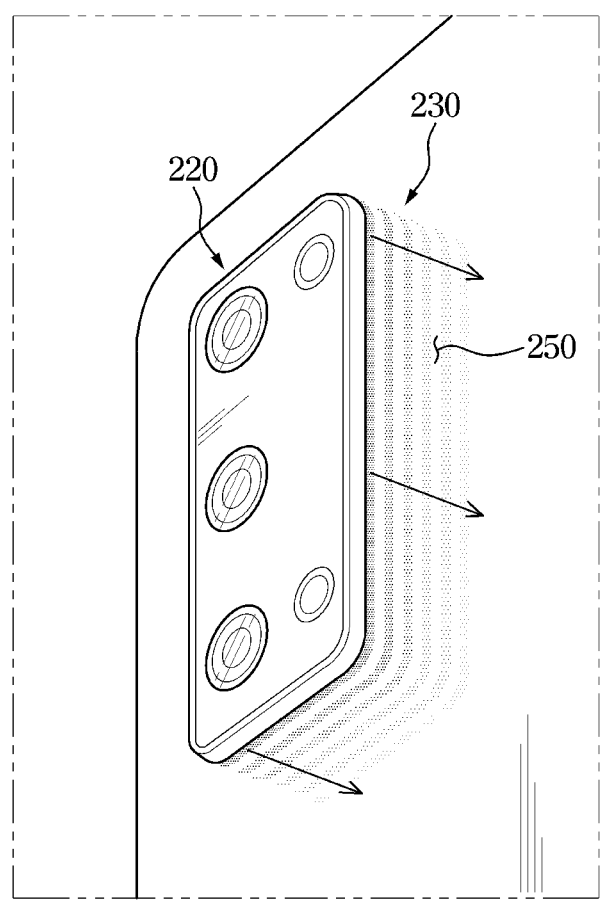
FIG. 7 is a rear perspective view illustrating a lighting effect in an example electronic device according to various embodiments.

FIG. 6 is a schematic diagram illustrating a main configuration of an example electronic device according to various embodiments. FIG. 7 is a rear perspective view illustrating a lighting effect in an example electronic device according to various embodiments.

Referring to FIGS. 6 and 7, according to an embodiment of the present disclosure, the glass 231, the optical adhesive layer 232, the protective film layer 233, the first reflective layer 234, the pattern layer 235, the reflective space 236, and the second reflective layer 237 may be stacked in the first direction. In addition, the reflective space 236, the blocking member 239, the light guide plate 238, the light source 240, and the substrate may be stacked in the second direction.

According to an embodiment of the present disclosure, the blocking member 239 may be provided a plurality of blocking members. The plurality of blocking members 239a, 239b may include a first blocking member 239a and a second blocking member 239b. The first blocking member 239a and the second blocking member 239b may have a thickness ratio of 2:1 in the first direction. In this way, when light is transmitted through lighting regions 250, discontinuous lighting shapes may be formed at regular intervals. However, the thickness ratio of the first blocking member 239a to the second blocking member 239b is not limited to the above example. For example, the plurality of blocking members 239 may include a third blocking member. In this case, the first blocking member, the second blocking member, and the third blocking member may have a thickness ratio of 2:2:1 in the first direction.

According to an embodiment of the present disclosure, light may be emitted from the light source 240 toward the light guide plate 238. The light passing through the light guide plate 238 may be diffused and directed to the first reflective layer 234 and/or the second reflective layer 237 of a reflection region. Most of the light passing through the light guide plate 238 to reach the second reflective layer 237 may be reflected. The light reflected from the second reflective layer 237 may pass through the reflective space 236 and the pattern layer 235. Most of the light passing through a region adjacent to the light guide plate 238 of the pattern layer 235 may be transmitted, and most of the light passing through a region far from the light guide plate 238 of the pattern layer 235 may be absorbed by the pattern layer 235. The light passing through the pattern layer 235 may be reflected or transmitted by the first reflective layer 234. The light reflected from the first reflective layer 234 may return to the reflective space 236 again and may be reflected from the second reflective layer 237. The light transmitted in the first reflective layer 234 may be transmitted to the outside to generate the lighting regions 250 as shown in FIG. 7. The lighting regions 250 may be formed in discontinuous lighting shapes as shown in FIG. 7. The discontinuous lighting shapes may be spaced at equal intervals.

According to one embodiment of the present disclosure, the lighting regions 250 or the lighting shapes shown in FIG. 7 may be faded out while maintaining the same area. In addition, the lighting regions 250 may be formed perpendicular to the camera module 220.

Figure 8:
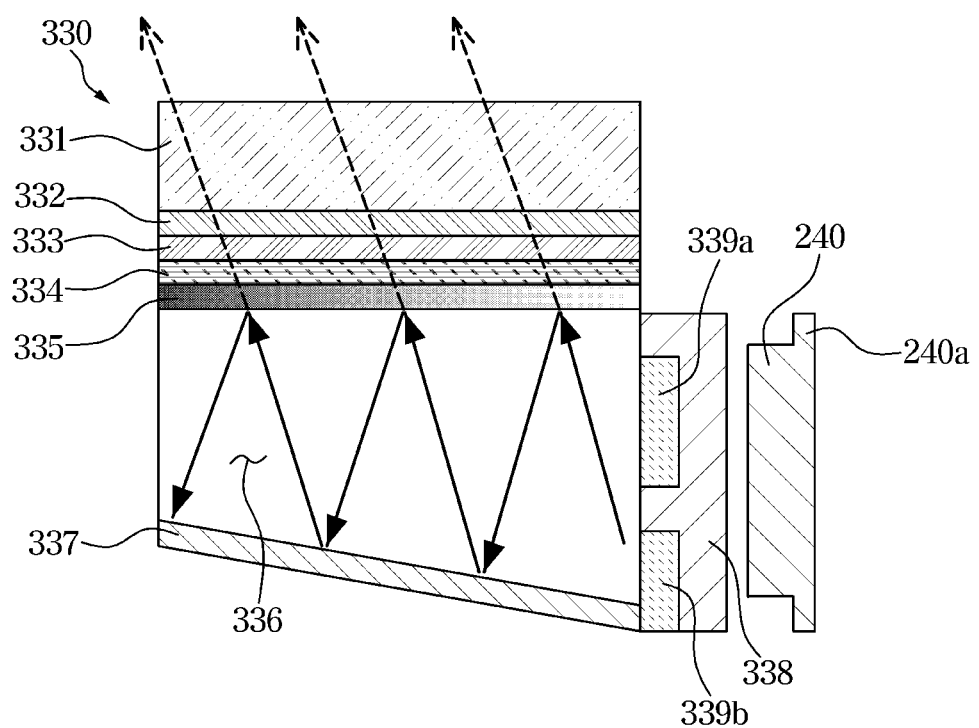
FIG. 8 is a schematic diagram illustrating a main configuration of an example electronic device according to various embodiments.
Figure 9:
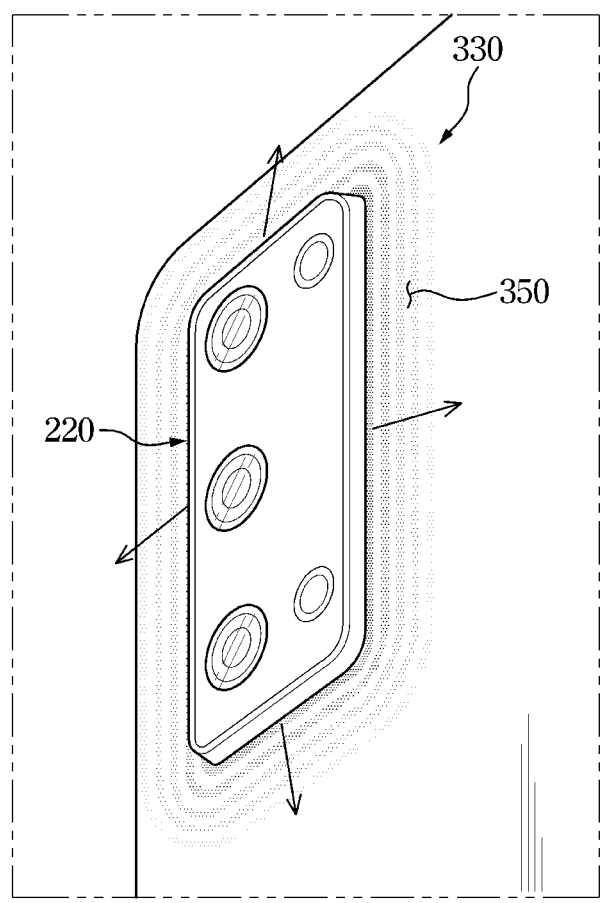
FIG. 9 is a rear perspective view illustrating a lighting effect in an example electronic device according to various embodiments.

FIG. 8 is a schematic diagram illustrating a main configuration of an example electronic device according to various embodiments. FIG. 9 is a rear perspective view illustrating a lighting effect in an example electronic device according to various embodiments.

Referring to FIGS. 8 and 9, in a glass assembly 330 according to an embodiment of the present disclosure, a glass 331, an optical adhesive layer 332, a protective film layer 333, a first reflective layer 334, a pattern layer 335, a reflective space 336, and a second reflective layer 337 may be stacked in the first direction. In addition, the reflective space 336, a blocking member 339a, 339b, a light guide plate 338, a light source 240, and a substrate 240a may be stacked in the second direction.

According to an embodiment of the present disclosure, the second reflective layer 337 and the first reflective layer 334 may be disposed to be inclined relative to each other. For example, the second reflective layer 337 may have an inclination with respect to the first reflective layer 334 to narrow the reflective space 336 as the distance from the light source 240 and the light guide plate 338 increases. In this way, as shown in FIG. 9, lighting regions 350 or lighting shapes may be faded out while areas are widened. In addition, the lighting regions 350 may be formed in a shape spreading out as the distance from the camera module 220 increases. However, the shape and arrangement of the second reflective layer 337 are not limited thereto, and the shape of the second reflective layer 337 may, for example, be formed to have a curved surface. In this way, various lighting shapes may be implemented.

Figure 10:
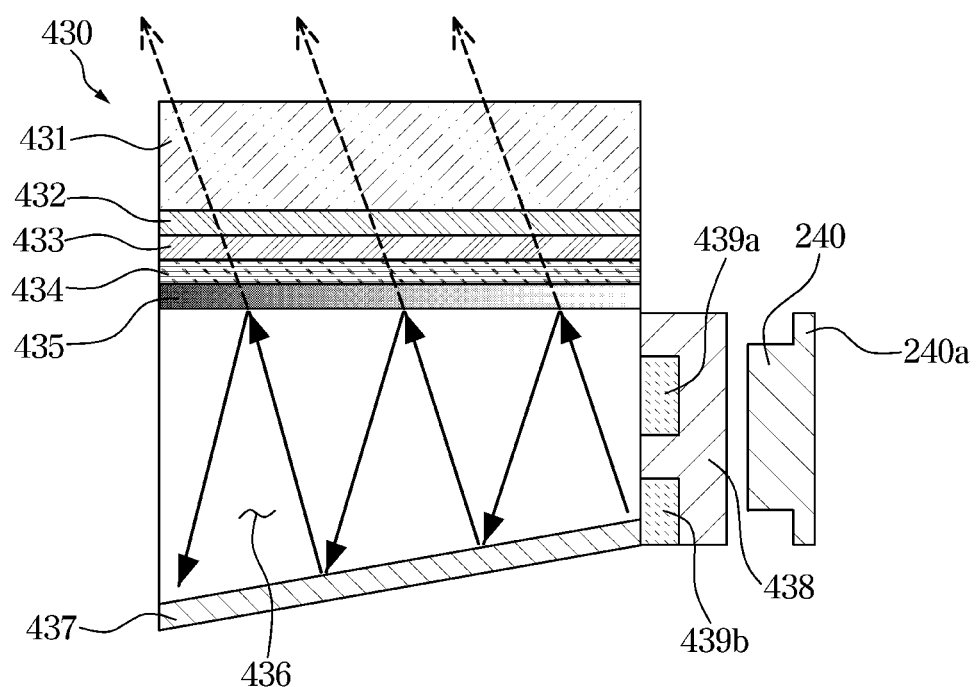
FIG. 10 is a schematic diagram illustrating a main configuration of an example electronic device according to various embodiments.
Figure 11:
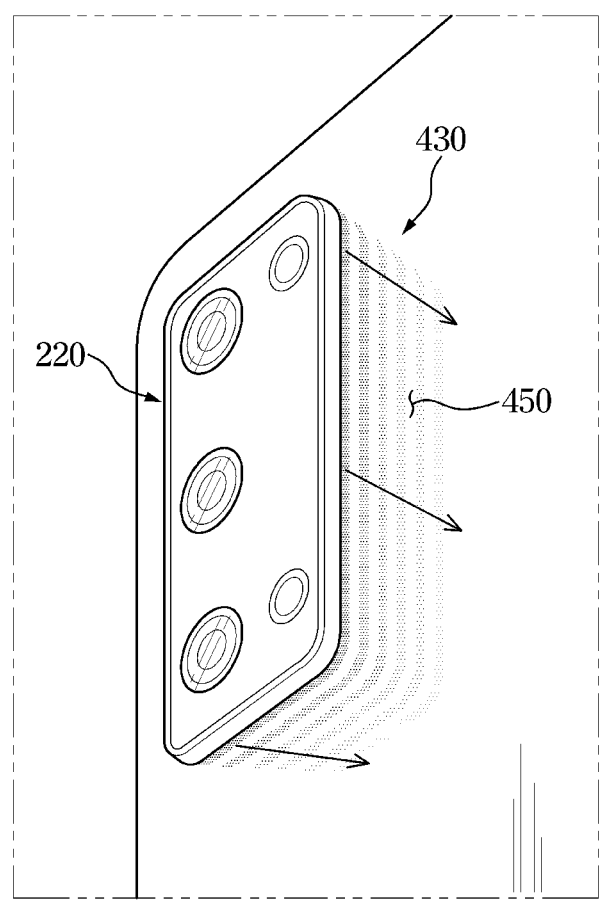
FIG. 11 is a rear perspective view illustrating a lighting effect in an example electronic device according to various embodiments.

FIG. 10 is a schematic diagram illustrating a main configuration of an example electronic device according to various embodiments. FIG. 11 is a rear perspective view illustrating a lighting effect in an example electronic device according to various embodiments.

Referring to FIGS. 10 and 11, in a glass assembly 430 according to an embodiment, a glass 431, an optical adhesive layer 432, a protective film layer 433, a first reflective layer 434, a pattern layer 435, a reflective space 436, and a second reflective layer 437 may be stacked in the first direction. In addition, the reflective space 436, a blocking member 439a, 439b, a light guide plate 438, the light source 240, and a substrate 240a may be stacked in the second direction.

According to an embodiment of the present disclosure, the second reflective layer 437 and the first reflective layer 434 may be disposed to be inclined relative to each other. For example, the second reflective layer 437 may have an inclination with respect to the first reflective layer 434 to widen the reflective space 436 as the distance from the light source 240 and the light guide plate 438 increases. In this way, as shown in FIG. 11, lighting regions 450 or lighting shapes may be faded out while areas are narrowed. In addition, the lighting regions 450 may be formed in a shape converging on one point as the distance from the camera module 220 increases. However, the shape and arrangement of the second reflective layer 437 are not limited thereto, and the shape of the second reflective layer 437 may, for example, be formed to have a curved surface. In this way, various lighting shapes may be implemented.

Figure 12:
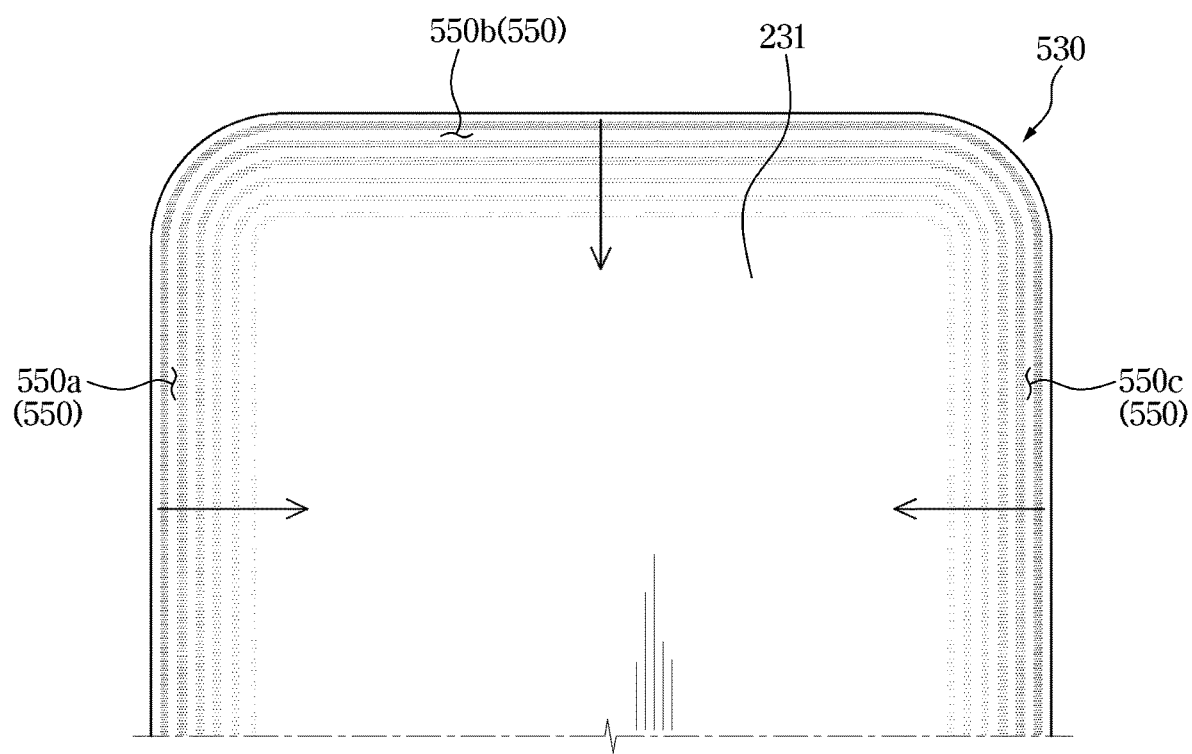
FIG. 12 is a plan view illustrating a lighting effect in an example electronic device according to various embodiments.

FIG. 12 is a plan view illustrating a lighting effect in an example electronic device according to various embodiments.

Referring to FIG. 12, according to an embodiment, a glass assembly 530 may be disposed at an outer periphery of the electronic device 200. For example, the glass assembly 530 may be disposed on a rear surface of the electronic device to form a lighting region 550 from an outer periphery line of the rear surface of the electronic device. Alternatively, a lighting shape may be formed in a shape entering an inside of the rear surface from a glass disposed at the outer periphery line of the rear surface of the electronic device.

However, the present disclosure is not limited thereto, and the glass assembly 530 may be disposed adjacent to the outer periphery of the electronic device 200 to form the lighting region 550 on an outer periphery of the front plate 202. The lighting shape formed in the lighting region 550 may be formed in a shape entering an inside of the electronic device from the outer periphery of the electronic device.

According to yet another embodiment of the present disclosure, the lighting region 550 may be provided as a plurality of lighting regions. The plurality of lighting regions 550 may include a first lighting region 550a, a second lighting region 550b, and a third lighting region 550c. The plurality of lighting regions 550 may exhibit different lighting effects on the basis of a frequency characteristic of a sound output from an audio module. According to an embodiment of the present disclosure, the electronic device 200 may control each of the first light-emitting element group 241 and/or the second light-emitting element group 242 based on a specific frequency band. For example, in the first lighting region 550a, the first light-emitting element group 241 and/or the second light-emitting element group 242 may be controlled based on characteristics of frequency ranging from 100 Hz to 250 Hz. In addition, in the second lighting region 550b, the first light-emitting element group 241 and/or the second light-emitting element group 242 may be controlled based on characteristics of frequency ranging from 500 Hz to 2000 Hz. In addition, in the third lighting region 550c, the first light-emitting element group 241 and/or the second light-emitting element group 242 may be controlled based on characteristics of 4 kHz or more frequency. A number of the light-emitting element groups is not limited to two and may be provided as one or three or more.

Figure 13:
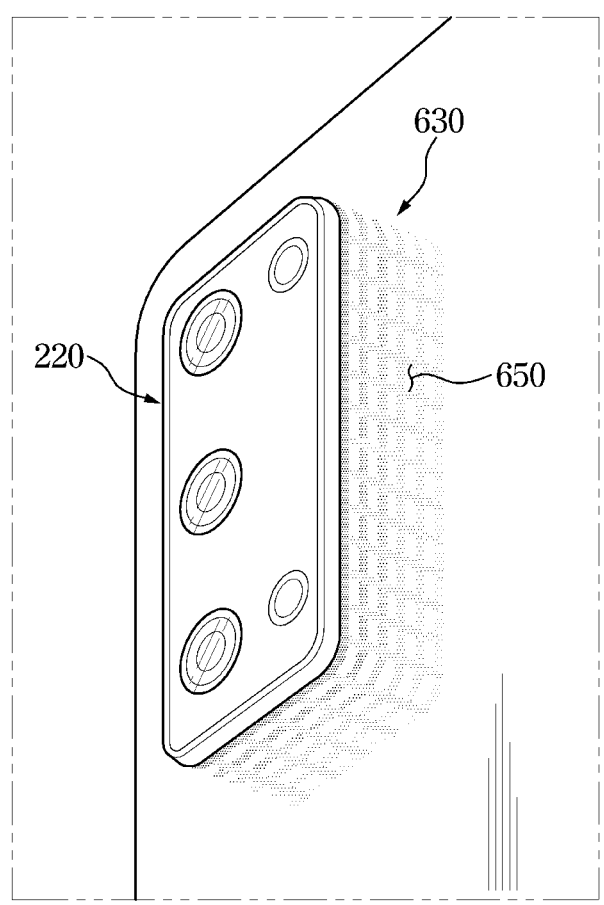
FIG. 13 is a rear perspective view illustrating a lighting effect in an example electronic device according to various embodiments.
Figure 14:
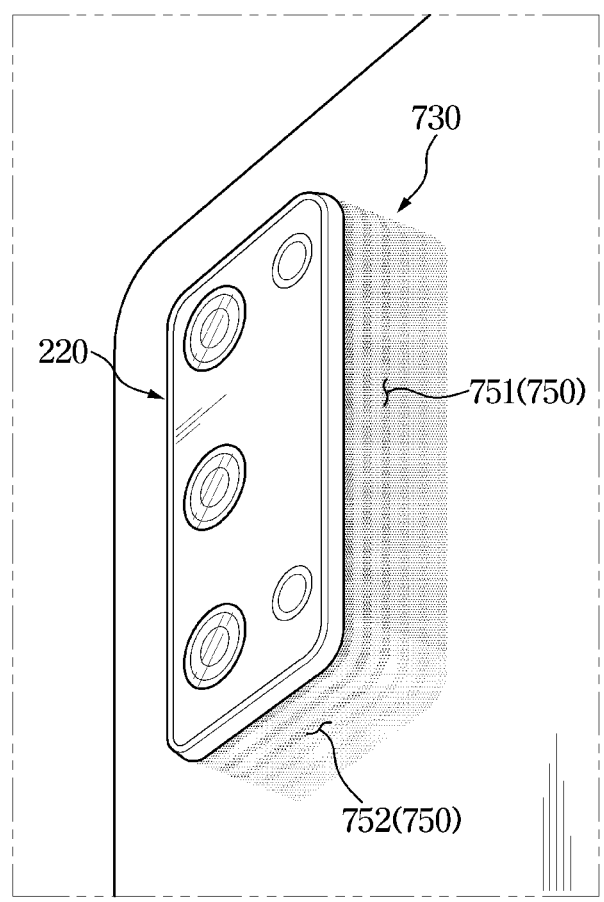
FIG. 14 is a rear perspective view illustrating a lighting effect in an example electronic device according to various embodiments.
Figure 15:
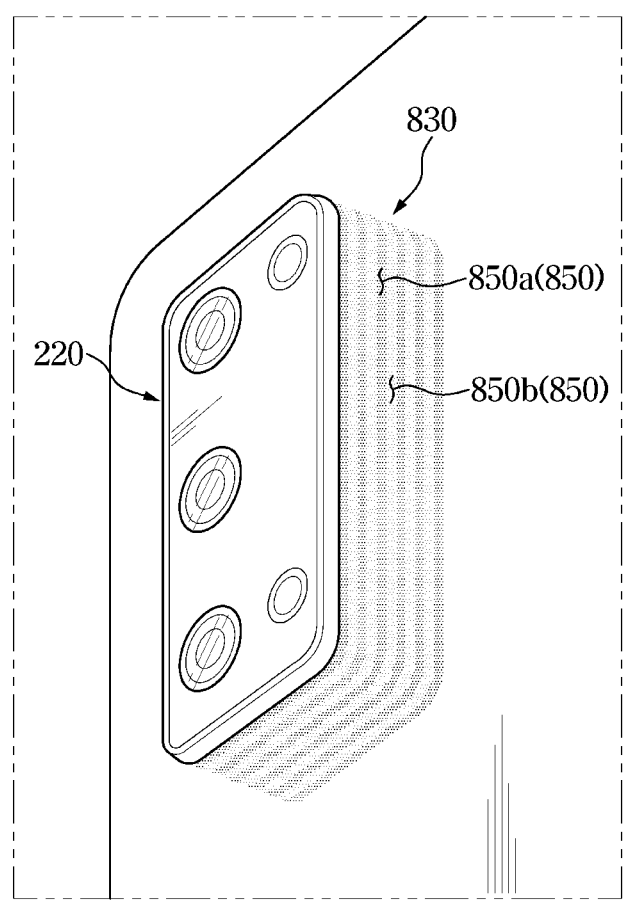
FIG. 15 is a rear perspective view illustrating a lighting effect in an example electronic device according to various embodiments.

FIG. 13 is a rear perspective view illustrating a lighting effect in an example electronic device according to various embodiments. FIG. 14 is a rear perspective view illustrating a lighting effect in an example electronic device according to various embodiments. FIG. 15 is a rear perspective view illustrating a lighting effect in an example electronic device according to various embodiments.

Referring to FIG. 13, according to an embodiment of the present disclosure, a straight lighting shape perpendicular to a lighting shape may be added to the lighting shape which is discontinuously formed in the Z direction in a lighting region 650. For example, the lighting shape formed in a glass assembly 630 may be formed to constitute a grid pattern.

Referring to FIG. 14, according to an embodiment of the present disclosure, the electronic device 200 including a glass assembly 730 may differently set lighting colors in each of a plurality of lighting regions 750. In this case, the plurality of lighting regions 750 may be formed on one side or the other side of the camera module 220. For example, the first light-emitting element group 241 may be used to implement a lighting shape of a first lighting region 751, and the second light-emitting element group 242 may be used to implement a lighting shape of a second lighting region 752. The first light-emitting element group 241 may emit darker light than the second light-emitting element group 242. Alternatively, the first light-emitting element group 241 and the second light-emitting element group 242 may emit light of different colors. In this way, since different colors may be implemented for each of the lighting regions 751 and 752, an aesthetic impression of the electronic device 200 can be increased.

Referring to FIG. 15, according to an embodiment of the present disclosure, the electronic device 200 including a glass assembly 830 may differently set lighting colors in each of a plurality of lighting regions 850. In this case, the plurality of lighting regions 850 may be alternately disposed in the Z direction. For example, in order to implement the above, the light source 240 may be formed to correspond to a shape of the light guide plate. Referring to FIG. 6, the light guide plate 238 facing the reflective space 236 may have two surfaces. In this case, a plurality of light sources 240 may be disposed to correspond to the two surfaces of the light guide plates 238, and thus light of different colors may be emitted. In this way, the first lighting region 850a and the second lighting region 850b may be formed with different colors. According to an embodiment of the present disclosure, since the electronic device 200 may implement different colors in the lighting regions 850a and 850b, an aesthetic impression of the electronic device can be increased.

Figure 16:
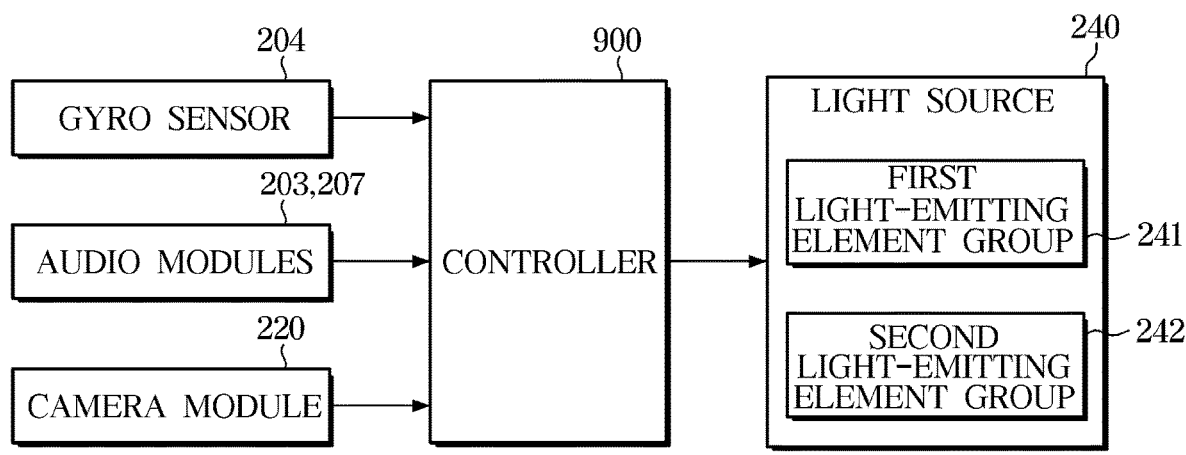
FIG. 16 is a block diagram illustrating an example control method of an example electronic device according to various embodiments.

FIG. 16 is a block diagram illustrating an example control method of an electronic device according to various embodiments.

Referring to FIG. 16, according to various embodiments of the present disclosure, the electronic device 200 may further include a controller 900 and a gyro sensor 204 (e.g., the sensor module 176 of FIG. 1). The controller 900 may receive a signal from at least one among the gyro sensor 204, the audio modules 203 and 207, and/or the camera module 220. The controller 900 may control the light source 240 based on the received signal.

The controller 900 (including, e.g., controller circuitry) may acquire inclination information of the electronic device 200 from the gyro sensor 204. In response to an inclination of the electronic device in one direction, the controller 900 may turn the first light-emitting element group 241 on. In addition, in response to an inclination of the electronic device in another direction, the controller 900 may turn the second light-emitting element group 242 on. For example, when the electronic device is inclined in a first direction, the controller 900 may control lighting of only two surfaces of four surfaces surrounding the camera module 220 to be turned on and the remaining two surfaces to be turned off based on the inclination information.

When a timer function of the camera module 220 is executed, the controller 900 may sequentially turn the plurality of light source groups 240 on according to a countdown of a timer. For example, during a countdown of five seconds, a light source group 240 provided on one surface of the four surfaces surrounding the camera module 220 may be turned on and off first, and then the remaining three surfaces may be sequentially turned on and off according to the countdown. In addition, all the plurality of light source groups 240 positioned on the four surfaces may be made to emit light the last one second. When the countdown ends, as shown in FIGS. 13 to 15, lighting effects of different shapes or colors may be implemented in the plurality of lighting regions.

The controller 900 may control the light source 240 based on the audio modules 203 and 207 for converting an electrical signal into a sound. For example, discussed with reference to FIG. 12, in the first lighting region 550a, the first light-emitting element group 241 and/or the second light-emitting element group 242 may be controlled based on characteristics of frequency ranging from 100 Hz to 250 Hz of sounds output from the audio module. In addition, in the second lighting region 550b, the first light-emitting element group 241 and/or the second light-emitting element group 242 may be controlled based on characteristics of frequency ranging from 500 Hz to 2000 Hz of the sounds output from the audio module. In addition, in the third lighting region 550c, the first light-emitting element group 241 and/or the second light-emitting element group 242 may be controlled based on characteristics of 4 kHz or more frequency of the sounds output from the audio module. A number of light-emitting element groups is not limited to two and may be provided as one or three or more.

The controller 900 may control the light source 240 to emit light of a color corresponding to each application. Alternatively, when receiving a call, the controller 900 may control the light source 240 to emit light of different colors according to callers.

Specific embodiments have been shown and described above. However, the present disclosure is not limited to the above embodiments, and those skilled in the art to which the present disclosure pertains can make various changes without departing from the gist of technical spirit of the present disclosure set forth in the appended claims.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising a camera module, the electronic device comprising:
    at least one glass assembly disposed adjacent to an outer periphery of the camera module or an outer periphery of the electronic device,
    wherein the glass assembly includes:
    glass;
    a first reflective layer stacked on the glass and configured to transmit and reflect light emitted from a light source;
    a second reflective layer spaced apart from the first reflective layer and having a higher reflectance than the first reflective layer;
    a reflective space between the first reflective layer and the second reflective layer;
    a light source disposed on one side of the reflective space and configured to emit light; and
    a pattern layer stacked on the first reflective layer to face the reflective space and having a pattern which becomes darker as distance from the light source increases.

2. The electronic device of claim 1, wherein the glass assembly includes light guide plates disposed between the reflective space and the light source and configured to diffuse the light emitted from the light source.

3. The electronic device of claim 2, wherein:
    the glass, the first reflective layer, the pattern layer, the reflective space, and the second reflective layer are arranged in a first direction; and
    the light source is disposed to surround the camera module, and the light emitted from the light source passes through the light guide plates to enter the reflective space.

4. The electronic device of claim 3, wherein the glass assembly further includes a light blocking member disposed between the light guide plates to block the light emitted from the light source and provided to face the reflective space.

5. The electronic device of claim 4, wherein:
    the light blocking member includes a plurality of blocking members; and
    the plurality of blocking members include a first blocking member disposed in the light guide plate, and a second blocking member spaced apart from the first blocking member in the first direction and formed to be thinner than the first blocking member.

6. The electronic device of claim 5, wherein the first blocking member and the second blocking member are formed to have a thickness ratio of 2:1.

7. The electronic device of claim 2, wherein:
    the glass, the first reflective layer, the pattern layer, the reflective space, and the second reflective layer are disposed in a front-rear direction; and
    the light source is disposed at an outer periphery of the electronic device, and the light emitted from the light source passes through the light guide plates to enter the reflective space.

8. The electronic device of claim 1, wherein the second reflective layer is disposed to be inclined with respect to the first reflective layer so that a distance between the first reflective layer and the second reflective layer changes with distance from the light source.

9. The electronic device of claim 8, wherein the reflective space narrows as the distance from the light source increases.

10. The electronic device of claim 1, wherein:
    the light source includes a first light-emitting element group configured to emit light in one direction of the electronic device and a second light-emitting element group configured to emit light in another direction; and
    the electronic device includes a controller configured to control driving of the light source.

11. The electronic device of claim 10, further comprising a gyro sensor,
wherein the controller configured to:
acquire inclination information of the electronic device from the gyro sensor;
turn on the first light-emitting element group in response to an inclination of the electronic device in a first direction; and
turn on the second light-emitting element group in response to an inclination of the electronic device in a second direction opposite to the first direction.

12. The electronic device of claim 10, wherein, upon a timer function of the camera module being executed, the controller is configured to sequentially turn on the first light-emitting element group and the second light-emitting element group according to a countdown of a timer of the timer function.

13. The electronic device of claim 12, wherein the controller is configured to turn on both the first light-emitting element group and the second light-emitting element group in response to an end of the countdown of the timer.

14. The electronic device of claim 10, further comprising an audio module configured to convert an electrical signal into a sound,
wherein the controller is configured to control the first light-emitting element group based on a frequency characteristic in a first frequency band of the electrical signal and control the second light-emitting element group based on a frequency characteristic in a second frequency band of the electrical signal.

* * * * *